A. R. HILL.
Cotton-Scraper.

No. 222,905.  Patented Dec. 23, 1879.

Witnesses:
J. W. Garner
Wm. H. Mortimer

Inventor:
A. R. Hill
per
F. A. Lehmann
Atty

UNITED STATES PATENT OFFICE.

ABNER R. HILL, OF ATLANTA, TEXAS.

IMPROVEMENT IN COTTON-SCRAPERS.

Specification forming part of Letters Patent No. 222,905, dated December 23, 1879; application filed November 14, 1879.

*To all whom it may concern:*

Be it known that I, ABNER R. HILL, of Atlanta, in the county of Cass and State of Texas, have invented certain new and useful Improvements in Cotton-Scrapers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-scrapers; and it consists in the peculiar construction of the scraper, which is secured to the stock or standard so as to project out to one side of the cultivator-shovel, as will be more fully described hereinafter.

Figure 1:
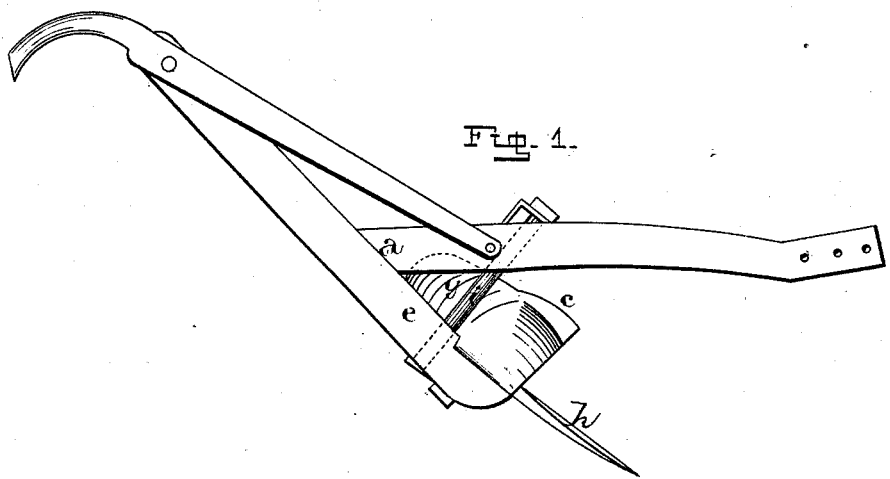
Figure 2:
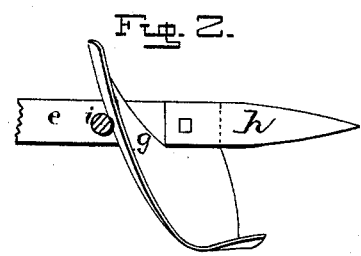
Figure 3:
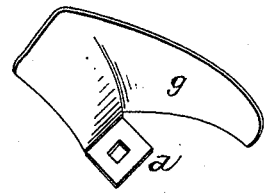

Figure 1 is a side elevation of my invention. Fig. 2 is a horizontal section of the same. Fig. 3 is a perspective of the scraper alone.

$a$ represents a common cultivator, such as is in general use. The scraper $c$ is formed from a single piece of metal, and consists of the shank $d$, which is secured directly to the standard $e$ by the same bolt that fastens on the shovel $h$, and the long extension or wing $g$, which is curved over in front of the standard, as shown. The outer lower corner of this scraper is bent forward, as shown, so as to catch all of the weeds and grass that are loosened, and start them upward upon the bent portion of the scraper, and thus have them thrown clear over on the other side of the standard. The lower straight edge of this scraper, which cuts or scrapes away the weeds, comes just about on a level with the lower end of the standard, while the extension $g$, as it passes over in front of the standard, is braced in position by means of the beam and the bolt $i$, which passes down through both beam and standard. This extension being so thoroughly braced upon its rear side, it can never be bent or broken by any ordinary work. While this scraper cuts to the right it carries everything to the left, so as to deposit it in the middle of the row.

Although the common form of cultivator is here shown, this scraper can be used in connection with other forms of plows.

Having thus described my invention, I claim—

The scraper $c$, formed substantially as described, and having the shank $d$ secured directly to the standard, and the extension or wing $g$ extending across the front of the plow-standard, substantially as shown.

In testimony that I claim the foregoing I have hereunto set my hand this 27th day of October, 1879.

ABNER R. HILL.

Witnesses:
A. J. NEWTON,
W. A. HOWE.